United States Patent
Watanabe et al.

(10) Patent No.: US 8,108,682 B2
(45) Date of Patent: Jan. 31, 2012

(54) HASH VALUE GENERATOR

(75) Inventors: Dai Watanabe, Kawasaki (JP);
Hisayoshi Sato, Ebina (JP)

(73) Assignee: Hitachi, Ltd., Tokyo (JP)

( * ) Notice: Subject to any disclaimer, the term of this patent is extended or adjusted under 35 U.S.C. 154(b) by 368 days.

(21) Appl. No.: 12/367,810

(22) Filed: Feb. 9, 2009

(65) Prior Publication Data

US 2010/0049986 A1 Feb. 25, 2010

(30) Foreign Application Priority Data

Aug. 22, 2008 (JP) ................. 2008-213466

(51) Int. Cl.
*H04L 9/32* (2006.01)
(52) U.S. Cl. ................ 713/181; 713/168; 380/28
(58) Field of Classification Search .......... 379/68, 379/70, 72; 713/181, 180, 174; 380/28
See application file for complete search history.

(56) References Cited

U.S. PATENT DOCUMENTS

| | | | |
|---|---|---|---|
| 7,941,525 B1 * | 5/2011 | Yavilevich | 709/224 |
| 2006/0095521 A1 * | 5/2006 | Patinkin | 709/206 |
| 2009/0214024 A1 * | 8/2009 | Schneider | 380/28 |
| 2010/0031052 A1 * | 2/2010 | Kim et al. | 713/181 |

OTHER PUBLICATIONS

Fakariah Hani Bt Mohd Ali, A Faster Version of Rijdael Criptographic Algorithm Using Cyclic Shift And Bitwise Operations Feb. 2004, Universiti Putra Malaysia.*

Bertoni G. et al., "Cryptographic Sponges," Online, Retrieved on Apr. 23, 2008; Internet URL: <http:sponge.noekeon.org/>.
Bertoli G. et al., "Sponge Functions," ECRYPT Hash Workshop 2007.
"Information technology-Security techniques-Hash-functions-Part 3: Dedicated hash-functions," International Standard, ISO/IEC 10118-3, Third Edition, 2004.

* cited by examiner

*Primary Examiner* — Jung Kim
*Assistant Examiner* — Ghodrat Jamshidi
(74) *Attorney, Agent, or Firm* — McDermott Will & Emery LLP

(57) ABSTRACT

To achieve high safety, large-sized nonlinear permutation is employed; however, the larger permutation processing is, the more the period of time required for the processing is, which hence is not efficient. There is provided a hash value generation method or a hash value generator which has the following aspects and which is highly safe and is capable of executing processing at a high speed.

1. As a message insertion method, there is employed a linear conversion in which the insertion message affects all sub-blocks.
2. An internal state is divided into a plurality of subblocks, and nonlinear permutation is conducted in each subblock unit.
3. Additionally, the linear conversion of item 1 above may be configured such that each subblock of the internal state affects the subblocks of the output.

8 Claims, 13 Drawing Sheets

HASH VALUE GENERATOR

INCORPORATION BY REFERENCE

This application claims priority based on a Japanese patent application, No. 2008-213466 filed on Aug. 22, 2008, the entire contents of which are incorporated herein by reference.

BACKGROUND

The present invention relates to a technique for generating a hash value by use of data having an arbitrary finite length and to an application technique of the same.

In signature creation and user authentication using a public key encryption technique, it is required to create a random number uniquely corresponding to an input. A method which is employed for this purpose and which creates a fixed-length random number (hash value) by use of data having an arbitrary finite length is referred to as a hash function.

It is necessary for the hash function to meet safety requirements such as a one-way property (an input corresponding to a given output can not be found) and a strongly collision-free property (mutually different two inputs which lead to one and the same output can not be found). Also, in order that the hash function is applicable to practical uses, the hash function is required to be processed at a high speed when it is implemented in the form of software or hardware. In addition, it is required to be efficient in the implementation cost. That is, when the hash function is implemented in the form of hardware, the number of required gates is small; when the hash function is implemented in the form of software, the number of steps and the memory area required in execution of the software are small.

A general encryption algorithm desirably satisfies these evaluation items at a high level.

In general, a hash function includes a compression function to process a fixed-length input. By repeatedly executing processing based on the compression function, input data having an arbitrary length is compressed and is randomized to finally produce a hash value as an output. Representative examples of a hash function is SHA-1, SHA-256, and Whirlpool (pages 13 to 15 and 19 to 22 of "ISO/IEC 10118-3 third edition Information technology-Security-techniques-Hash-functions" published on Mar. 1, 2004 in Switzerland; to be referred to as article 1).

A method of repeatedly executing the compression function which is employed in SHA-1, SHA-256, and Whirlpool described in article 1 is referred to as Merkle-Damgaard Strengthening. In this method, input data is divided into fixed-length data items (each data item thus divided is called a block) such that an output for a preceding block, i.e., an intermediate hash value and an input data block are used as inputs to the compression function to generate a next intermediate hash value.

SUMMARY OF THE INVENTION

In Merkle-Damgaard Strengthening, a large number of intermediate hash values having a length equal to that of a final hash value are generated in the process to generate the final hash value; however, it is known that this deteriorates safety of the hash function.

In contrast thereto, there exists a sponge function as a hash function configured such that the value during the calculation always has a length twice that of the final hash value (G. Bertoni, J. Daemen, M. Peeters, G. Van Assche, "Cryptographic Sponges"; Online, Retrieved on Apr. 23, 2008; Internet <URL:http://sponge.noekeon.org/>; to be referred to as article 2).

In the method of article 2, a large-sized nonlinear permutation is employed to achieve high safety. However, the larger the permutation processing is, the more the period of time required for the processing is; and hence this is not efficient. Therefore, a desire exists for a hash value generating technique capable of executing the processing at a high speed.

The present invention provides a hash value generating technique or apparatus capable of executing the processing at a high speed.

The present invention also provides an authentication apparatus employing the hash value generating technique.

The present invention has, for example, two aspects as below.

1. As a message insertion method, there is employed a linear conversion in which an insertion message affects all subblocks.
2. An internal state is divided into a plurality of subblocks such that the nonlinear permutation is conducted in each subblock unit.

Additionally, the present invention may be configured to include the following aspect.

3. The linear conversion of item 1 above is configured such that all subblocks in the internal state affect the output subblocks.

In the above embodiment, by strengthening the linear conversion with a cost reduced in the implementation, it is possible to mitigate the requirement for the strength of the nonlinear conversion. It is hence possible to provide a low-cost and high-speed hash generating technique without deteriorating the safety.

Furthermore, by using a small-sized nonlinear permutation, it is possible to implement with small gate size by reuse of circuits to be mounted or to process in high speed by parallel processing. It is hence possible to provide a hash generating technique capable of reducing the cost and increasing the processing speed according to purposes of usages.

A specific embodiment is a hash value generator for compressing a message having an arbitrary length and thereby generating a digest of the message, characterized in that the hash value generator comprises a message padding unit for receiving as an input thereto a message having an arbitrary length, executing padding processing for the message, and producing as an output therefrom a fixed-length data block according to a clock, a register for storing therein an intermediate value of conversion processing, an initializer unit for setting an initial value to the register, a data compression unit for conducting a conversion according to the clock by use of the value stored in the register and the data block produced from the message padding unit and thereby producing as an output therefrom a conversion result having a length of the register, a register control unit for updating, according to a clock, the value of the register by use of the output from the data compression unit, and a final processing unit for producing as an output therefrom a fixed-length bit string by use of the value stored in the register; and the data compression unit comprises a linear compression unit for producing as an output therefrom a conversion result having a length of the register by use of the data block and the value stored in the register and a nonlinear permutation unit for producing as an output therefrom a conversion result having a length of the register by use of the output from the linear compression unit.

Additionally, the nonlinear permutation unit of the hash value generator further comprises a second nonlinear permutation unit an input to which has a further shorter length and the data compression unit may execute processing as below.

$Y \leftarrow L(X, M[i])$, $Y[1] \| Y[2] \| \ldots \| Y[w] \leftarrow Y$, $Z[j] \leftarrow Qj(Y[j]), (1 \leq j \leq w)$, $Z \leftarrow Z[1] \| Z[2] \| \ldots \| Z[w]$ wherein, $A \leftarrow B$ indicates that B substitutes for A, $A \| B$ indicates a concatenation of A and B, $L(\ )$ is an output from the linear compression unit, $Qj(\ )$ indicates an output from the second linear permutation unit, $M[i]$ indicates an i-th data block outputted from the message padding unit, X is a value stored in the register, Y is an output from the linear compression unit, and Z indicates an output from the linear permutation unit.

Moreover, the linear compression unit of the hash value generator may execute processing as below.

$X[1] \| X[2] \| \ldots \| X[w] \leftarrow X$, $T \leftarrow C * (X[1] \text{ XOR } X[2] \text{ XOR } \ldots \text{ XOR } X[w])$, $Y[j] \leftarrow X[j] \text{ XOR } L[j](M[i]) \text{ XOR } T$, $Y \leftarrow Y[1] \| Y[2] \| \ldots \| Y[w]$ wherein, $A \leftarrow B$ indicates that B substitutes for A, $A \| B$ indicates a concatenation of A and B, A XOR B indicates an exclusive OR between A and B for each bit, $A*B$ is multiplication between A and B in a finite field, C is a non-zero constant, $L[j](\ )$ indicates a mutually different output from the linear permutation unit, $M[i]$ indicates an i-th data block outputted from the message padding unit, X is a value stored in the register, and Y is an output from the linear compression unit.

In addition, the linear compression unit of the hash value generator may execute processing as below.

$X[1] \| X[2] \| \ldots \| X[w] \leftarrow X$, $Y[j] \leftarrow X[j] \text{ XOR } M[i]$, $Y \leftarrow Y[1] \| Y[2] \| \ldots \| Y[w]$ wherein, $A \leftarrow B$ indicates that B substitutes for A, $A \| B$ indicates a concatenation of A and B, A XOR B indicates an exclusive OR between A and B for each bit, $M[i]$ indicates an i-th data block outputted from the message padding unit, X is a value stored in the register, and Y is an output from the linear compression unit.

Moreover, the second nonlinear permutation unit of the hash value generator comprises a third nonlinear permutation unit of which an input comprises eight words and which comprises a permutation table in units of four to eight bits, a linear permutation unit an input of which comprises two-word data, a constant adding unit, and a control unit to execute loop processing, wherein the constant to be added by the constant adding unit may differ for each loop.

Additionally, the linear permutation unit of the hash value generator may execute processing as below.

$a \leftarrow ax1, b \leftarrow bx1$;

$b \leftarrow b \text{ XOR } a$;

$a \leftarrow a <<< i1$;

$a \leftarrow a \text{ XOR } b$;

$b \leftarrow b <<< i2$;

$b \leftarrow b \text{ XOR } a$;

$a \leftarrow a <<< i3$;

$a \leftarrow a \text{ XOR } b$;

$b \leftarrow b <<< i4$;

$ay1 \leftarrow a, by1 \leftarrow b$;

wherein, x XOR y indicates an exclusive OR between x and y for each bit and "x<<<i" indicates an operation to cyclically shift x by i bits to the left in a one-word register and ax1 and bx1 are values stored in the registers, ay1 and by1 are outputs from the linear permutation units, i1, i2, i3 and i4 are non-zero constants.

Furthermore, of the parameters i1, i2, i3, and i4 determining the linear permutation of the hash value generator, it may be possible that i1 to i3 are even numbers, i4 is an odd number, and i2 is indivisible by four.

Also, the final processing unit of the hash value generator comprises a second register, a third register, a linear output unit for linearly combining values stored in the second register with each other to produce an output value and outputting the output value to the third register, and a nonlinear permutation unit for converting a value stored in the second register, wherein the hash value generator may repeatedly execute processing of the nonlinear permutation unit and the linear output unit until data stored in the third register reaches a predetermined output bit length.

Additionally, another embodiment of the present invention is a message authentication code generator comprising a configuration of the hash value generator for producing as an output therefrom a fixed-length bit string using a fixed-length secret key and a message having an arbitrary length.

Moreover, still another embodiment of the present invention is a system comprising at least one server, a plurality of terminals, and a network, characterized in that the server comprises an arithmetic unit, a memory, a storage, a communication unit, and an encryption processing unit; the terminal comprises an arithmetic unit, a memory, a storage, and an encryption processing unit; and the encryption processing unit comprises a configuration of the hash value generator.

According to the present invention, it is possible to provide a hash value generating technique which is capable of reducing the implementation cost in software and hardware and which is highly suitable for parallel arrangement.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Description of Terms

Hash function: A function to generate a fixed-length random number (hash value) by use of data having an arbitrary finite length.
Pseudorandom number: A finite or infinite bit string which cannot be discriminated from a truly random number in any method.
Truly random number (bit string): An infinite bit string for which, even if an arbitrary continuous sub-string is given, one next bit is not predictable.
Key: A secret parameter to be used in encryption processing.
Compression function: An encryption technique to generate a fixed-length random number using a fixed-length input, but its output length is less than the input length.
Nonlinear conversion: Update functions which are other than the linear conversion.
S box: A permutation table of about three to ten bits. By referring to the table, it is possible to conduct a conversion with high linearity and a high randomizing property, and the table can be implemented in a simple configuration. Hence, the reference table is often employed in software implementations of a cryptosystem.

Next, an embodiment of the present invention will be described by referring to drawings. However, the following description will be given by use of notations as follows.
A<-B indicates that B substitutes for A.
A∥B is a concatenation of A and B.
A XOR B is an exclusive OR between A and B for each bit.

Figure 1:
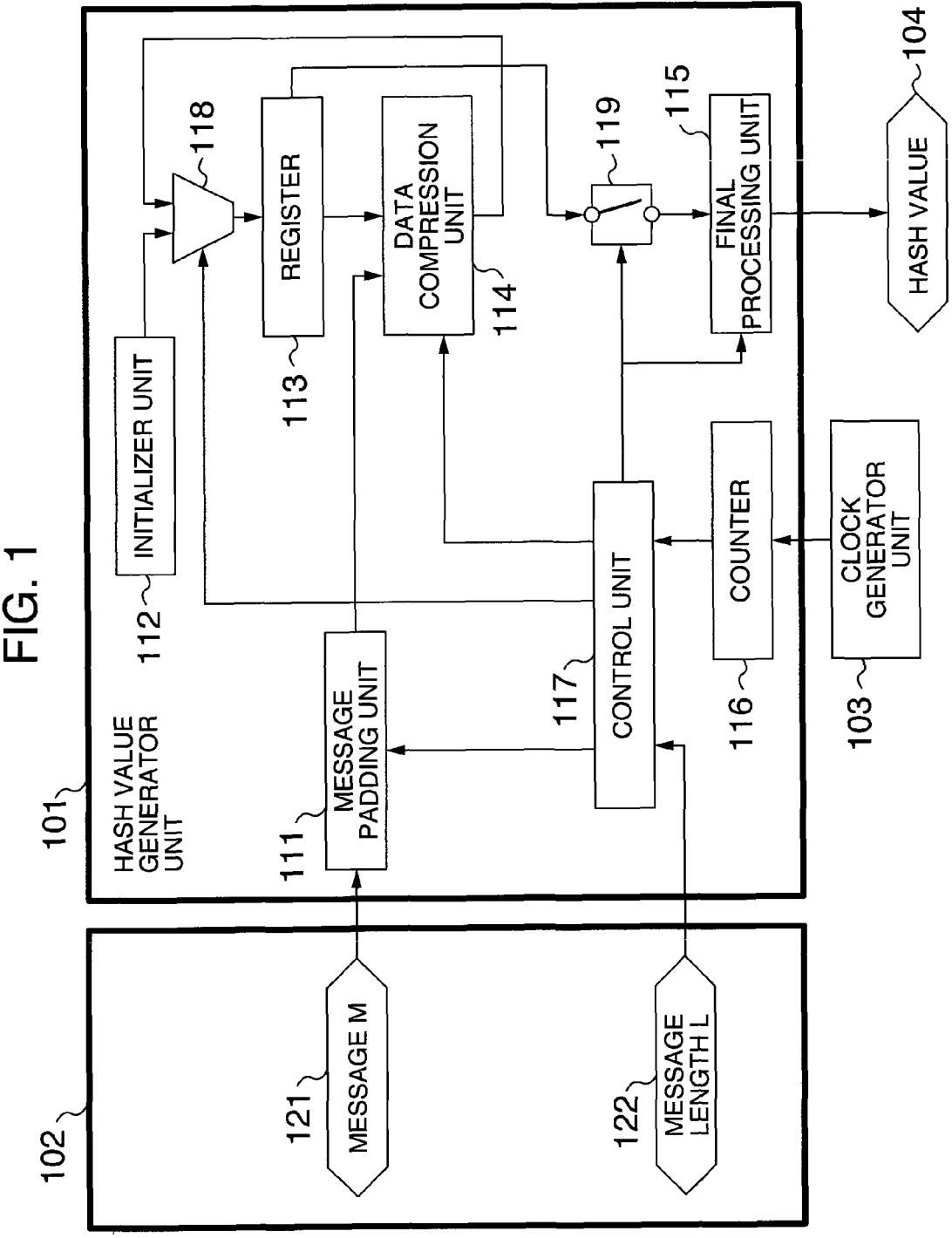
FIG. 1 is a diagram showing an example of a general configuration of a hash value generator in an embodiment.

FIG. 1 is a schematic diagram showing a functional configuration of a hash value generator in the present embodiment. Description will now be given of the configuration of the hash value generator according to FIG. 1.

The hash value generator 101 receives as an external input 102 a message M 121 and information 122 regarding a message length. These information pieces are given from a user to the hash value generator 101. In addition, the generator 101 receives from a clock generator unit 103 a clock signal which controls timing to operate circuits. Using these information pieces as inputs, the generator 101 produces a fixed-length hash value 104 as an output therefrom.

The hash value generator 101 includes a message padding unit 111, an initializer unit 112, a register 113, a data compression unit 115, a counter 116, a control unit 117, a selector 118 to control an input to the register 113, and a switch 119 to control an input to a final processing unit.

The control unit 117 conducts a changeover operation for the selector 118 and the switch 119. The control unit 117 receives a signal via the counter 116 from the clock generator unit 103. The control unit 117 establishes connection of the switch 119 to input the value kept in the register 113 to the final processing unit 115. The unit 115 produces as an output therefrom a hash value 104 using the given input. Also, when the clock signal is received, the control unit 117 makes the data compression unit 114 operate to update the value of the register 113.

The initializer unit 112 outputs an initial value of the register 113.

The message padding unit 111 adds a particular bit string to a message 121 inputted thereto to thereby adjust the data to an integral multiple of the length of the register 113. The unit 111 may add via the control unit 117 an information piece 122 regarding the message length to the message 121.

The configuration may be realized using hardware, software, or a combination thereof.

In a case wherein all or part of the configuration is realized using software, the respective components to execute processing of the embodiment are materialized in a general computer including a Central Processing Unit (CPU), a memory, and an external storage when the CPU executes the software (programs) stored in the memory.

These programs may be beforehand stored in the memory in the computer or the external storage or may be introduced according to necessity from another device via a mountable and demountable storage medium or a communication medium (a network to which the computer is connectible or a carrier and a digital signal propagating through the network) available for the computer.

Figure 2:
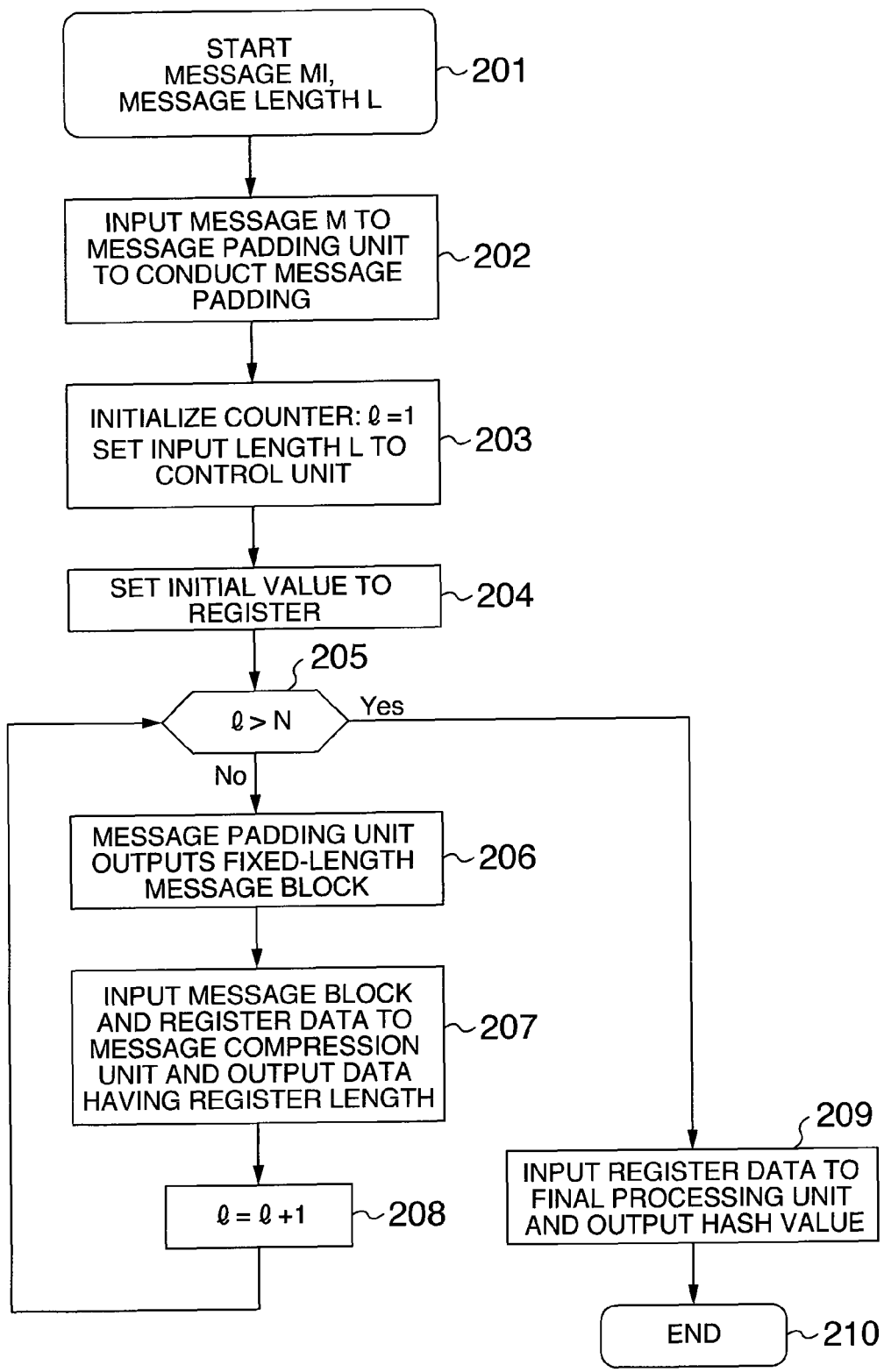
FIG. 2 is a flowchart showing an example of a processing procedure of the hash value generator in the embodiment.

FIG. 2 is a flowchart showing a processing procedure of the hash value generator 101 of FIG. 1. Referring now to FIG. 2, description will be given of the processing procedure of the hash generator 101 in the embodiment.

Step 1 (201): The hash value generator 101 receives a message M 121 and information L 122 regarding a message length and starts operation according to a signal from the control unit 117.

Step 2 (202): The message padding unit 111 adds a bit string to the received message M 121 such that the data length is an integral multiple of the register 113 in a predetermined method. The message resultant from the padding processing is represented as M'=M[1], M[2], . . . , M[N].

Step 3 (203): The hash value generator 101 sets the value of the counter 116 to one. Also, the generator 101 sets to the control unit 117 the number of processing iterations N of the data compression unit, the number N being determined by the information regarding the message length.

Step 4 (204): The generator 101 sets to the register 113 an initial value outputted from the initializer unit 112.

Step 5 (205): The hash value generator 101 receives a signal from the clock generator unit 103 and executes the following step if the value of the counter 116 is equal to or less than N. If the value is more than N, the generator 101 executes processing of step 6 (209). In other cases, the generator 101 executes processing of step 7 (206) and subsequent steps.

Step 6 (209, 210): The generator 101 sets the switch 119 to a connected state to input data of the register 113 to the final processing unit 115. When the input is received, the unit 115 outputs a hash value 104.

Step 7 (206): The message padding unit 111 inputs a message block M[l] having a fixed message block length to the data compression unit 114 according to the numeric value of the counter 116.

Step 8 (207): The data compression unit 114 executes randomization processing and compression processing by use of the data stored in the register 113 and the message block M[1] inputted from the message padding unit 111 and sets an output from the processing to the register 113.

Step 9 (208): The value of the counter 116 is incremented.

Figure 3:
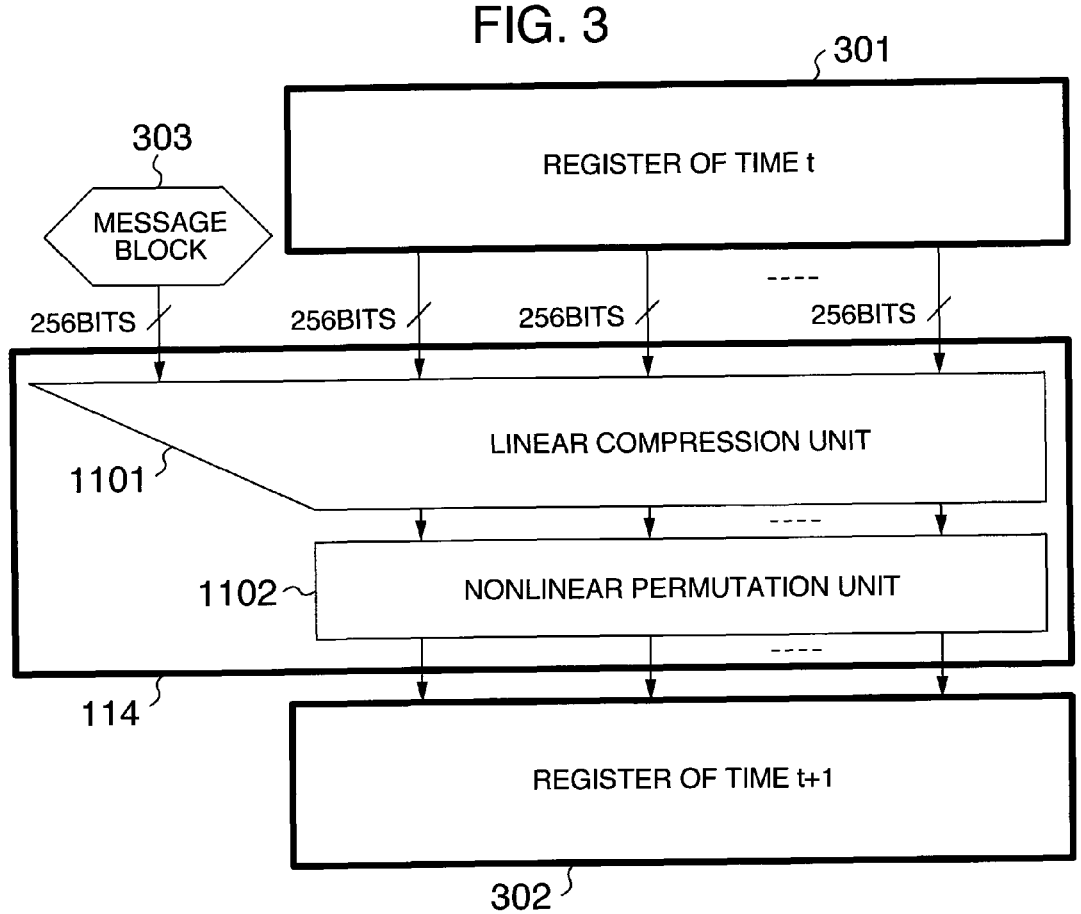
FIG. 3 is a diagram showing an example of structure of the data compression unit of the hash value generator in the embodiment.

FIG. 3 is a schematic diagram showing structure of the data compression unit 114 of the hash value generator 101 in the embodiment.

In FIG. 3, for convenience, the register 113 is separately shown as a register 301 at a point of time t and a register 302 at a point of time t+1. The data compression unit 114 produces the state of the register 302 at time t+1 by use of the state of the register 301 at time t. The unit 114 includes one linear compression unit 1101 and one nonlinear permutation unit 1102. The linear compression unit 1101 receives as inputs thereto a message block 303 and a value of the register 114 to conduct a linear conversion and outputs data of the register length. The nonlinear permutation unit 1102 receives as an input thereto an output Y from the linear compression unit 1101 to output data of the register length.

The linear compression unit 1101 desirably has a property in which each bit of the message block 303 affects many output bits.

For example, when the conversion matrix of the linear compression unit is expressed as L, it is solely necessary that a matrix (I|L) is a generator matrix of the maximum distance separable code. Here, I indicates a unit matrix and (I|L) indicates a concatenation of the matrices I and L. Also, in a case wherein the data stored in the register 114 has a size which is an integral multiple of the block length of the message block, if data is X, the linear compression unit 1101 conducts a conversion as below.

$$X[1]\|X[2]\|\ldots\|X[w]<-X,$$

$$Y[j]<-X[j] \text{ XOR } M[i], 1=<j=<w,$$

$$Y<-Y[1]\|Y[2]\|\ldots\|Y[w].$$

By using the conversion of this kind, even if the nonlinear permutation unit is lower in diffusion than the conventional sponge function, it is possible to guarantee high safety.

Specific structure of the linear compression unit 1101 and the nonlinear permutation unit 1102 will be described later.

Figure 4:
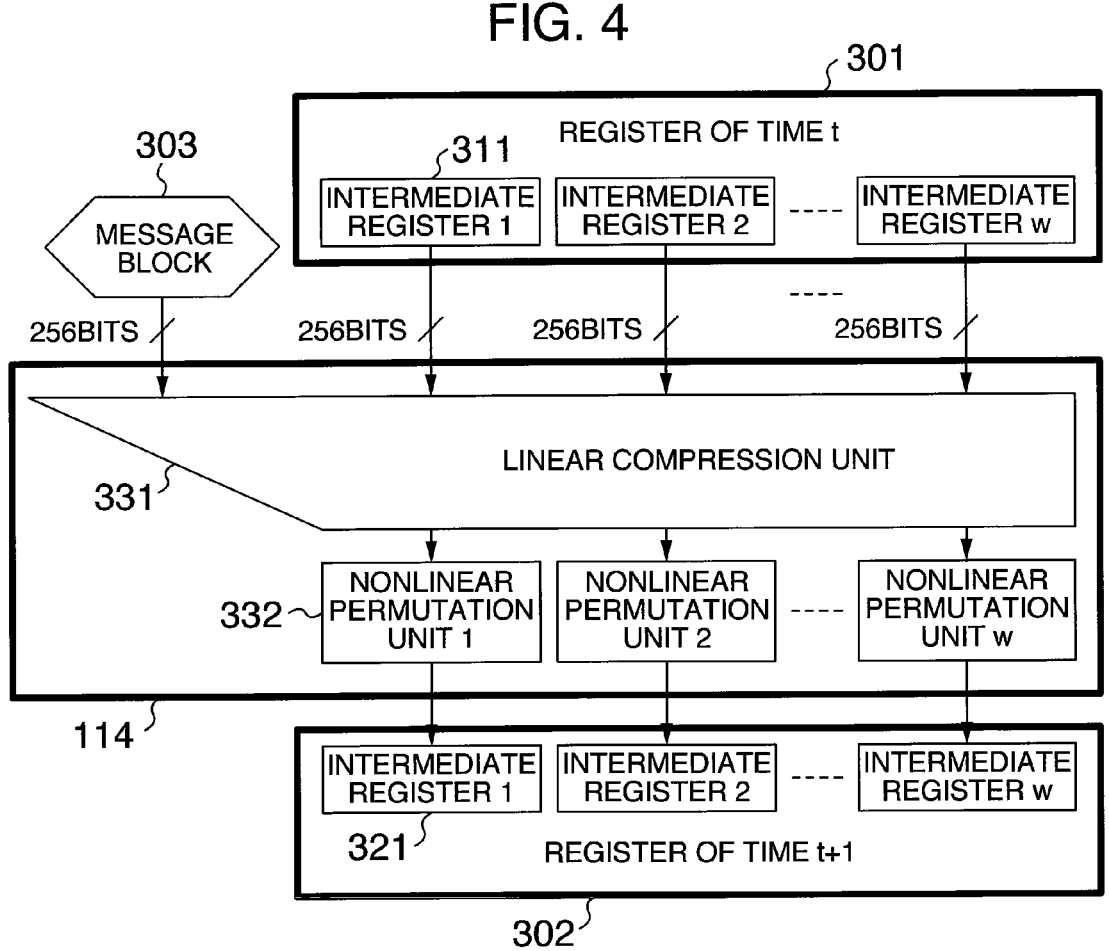
FIG. 4 is a diagram showing an example of general structure of the data compression unit employed in the hash value generator of an embodiment.

FIG. 4 is a schematic diagram showing structure of the hash value generator 101 and the data compression unit 141 in another embodiment of the present invention.

In FIG. 4, the register 301 includes w intermediate registers 311. The intermediate registers will be represented as an intermediate register 1, an intermediate register 2, ..., and an intermediate register w. The intermediate registers may differ in size from the hash value outputted from the final processing unit. Each intermediate register further includes a plurality of small registers. In the embodiment, each small register has a size of one word. In the embodiment, it will be assumed that each intermediate register includes eight small registers.

The data compression unit 114 includes one linear compression unit 331 and w nonlinear permutation units 332. To discriminate these nonlinear permutation units, the units are represented as a nonlinear permutation unit 1, a nonlinear permutation unit 2, ..., and a nonlinear permutation unit w. The respective nonlinear permutation units conduct nonlinear permutations to execute mutually different processings. The data compression unit 114 receives as an input thereto the value of the register 301 and conducts a linear conversion for the value to produce as an output therefrom data equal in length to the register. The data compression unit 114 equally divides the output from the linear compression unit 331 into 8-words pieces to input the respective pieces to the nonlinear permutation unit 332. An output from a nonlinear permutation unit Qj 332 is written in an intermediate register j 321 at an associated point of time t+1. Assuming that the values of the intermediate registers at a point of time t are X[1], X[2], ..., X[w], those of the intermediate registers at time t+1 are Y[1], Y[2], ..., Y[w], and the message block is M[i]; the processing of the data compression unit 114 can be represented by the following expression.

$$Y[j]<-Qj(Lj(X[1],X[2],\ldots,X[w],M[i]),(1=<j=<w),$$

wherein, (L1, L2, ..., Lw) indicates the conversion of the linear compression unit 331.

Figure 5:
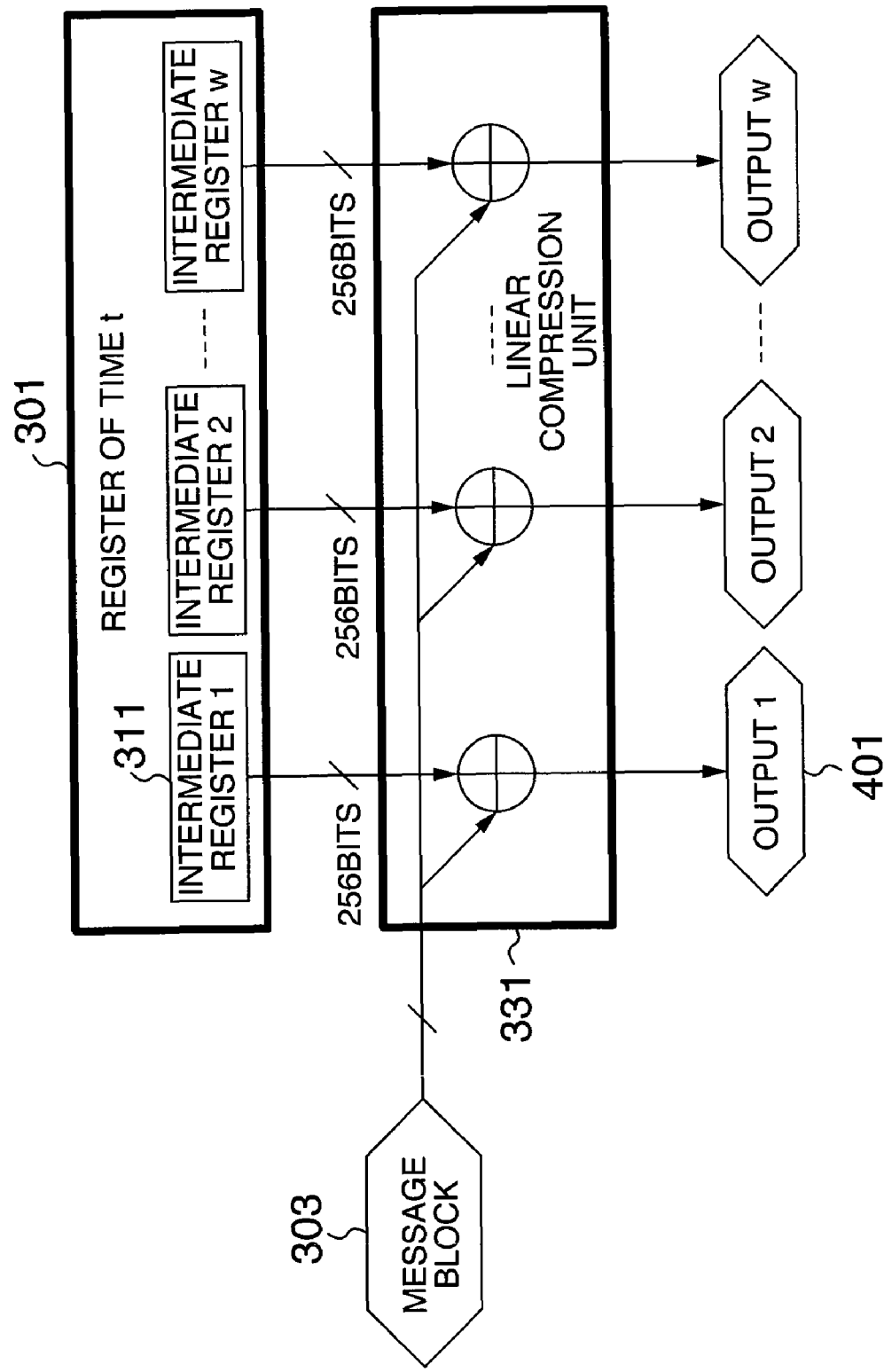
FIG. 5 is a diagram showing an example of the general configuration of the linear compression unit employed in the data compression unit of the embodiment.

FIG. 5 is a schematic diagram showing an example of the configuration of the linear compression unit 331 when the message block 303 is equal in size to the intermediate registers 311 in the embodiment.

The linear compression unit 331 conducts an exclusive OR operation between the message block 303 and data stored in each of the intermediate registers 311.

Figure 6:
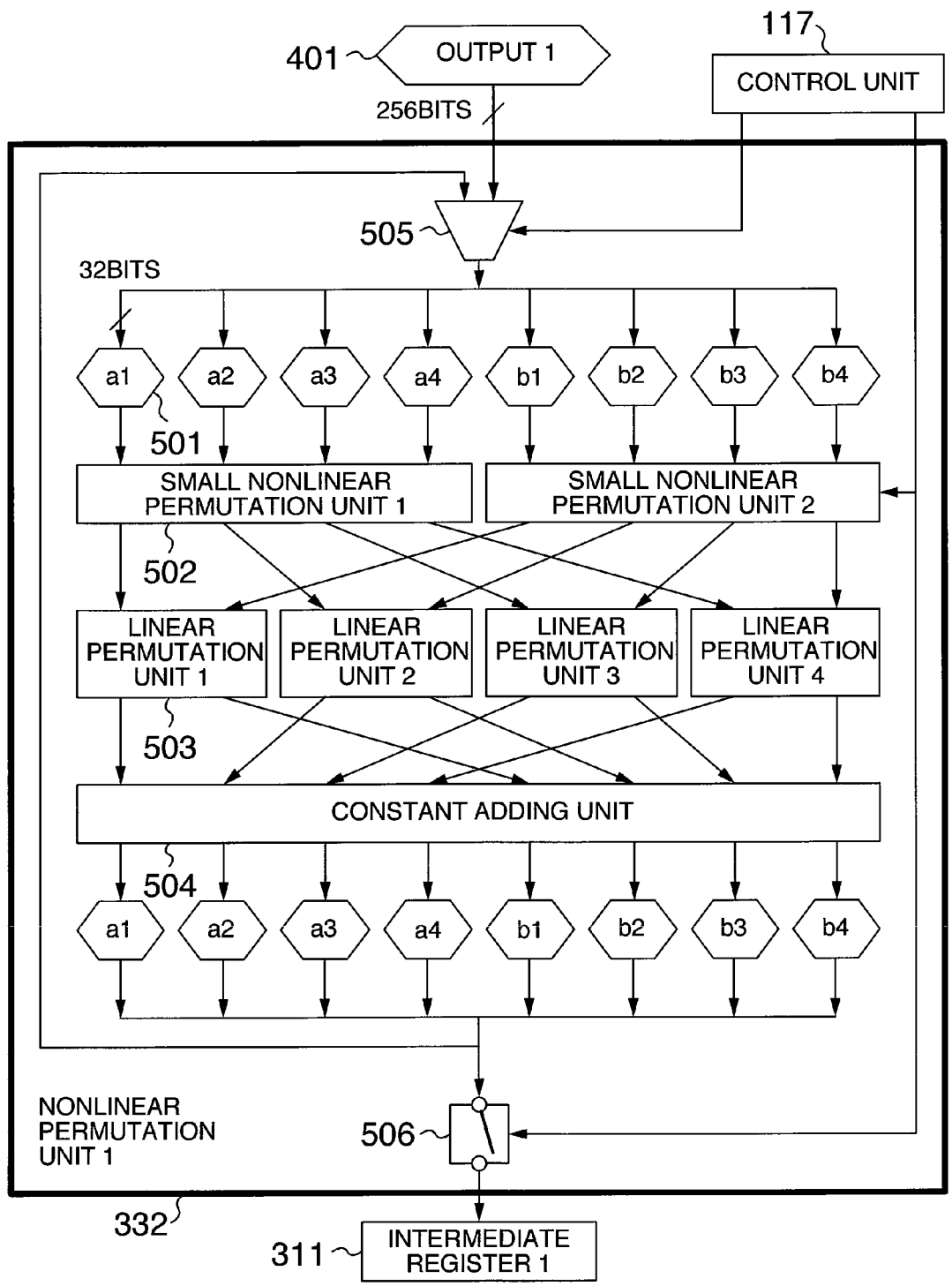
FIG. 6 is a diagram showing an example of a general configuration of the nonlinear permutation unit employed in the data compression unit of the embodiment.

FIG. 6 is a schematic diagram showing a configuration example of the nonlinear permutation unit 332 of FIG. 4. The unit 332 acquires part of the data outputted from the linear compression unit 331 and randomizes the acquired data to output the resultant data. The nonlinear permutation unit 332 includes two small nonlinear permutation units 502, four linear permutation units 503, one constant adding unit 504, as well as a selector 505 and a switch 506 which control the number of processing iterations.

The selector 505 receives a signal from the control unit 117 to conduct a changeover operation between an input from the linear compression unit 331 and a loop input. The number of loops is desirably equal to or more than eight.

Also, if the width of the registers 301 and 302 is an integral multiple of 256 bits, it is also possible to construct the nonlinear permutation unit shown in FIG. 3 by arranging a plurality of the nonlinear permutation units 332.

The processing which the nonlinear permutation unit 332 executes within the loop is represented by the following expression.

$$a1\|a2\|a3\|a4\|b1\|b2\|b3\|b4<-Y[i];$$

$$ax1\|ax2\|ax3\|ax4<-S1(a1,a2,a3,a4);$$

$$bx1\|bx2\|bx3\|bx4<-S2(b1,b2,b3,b4);$$

$$ay1\|by1<-L1(ax1,bx1);$$

$$ay2\|by2<-L2(ax2,bx2);$$

$$ay3\|by3<-L3(ax3,bx3);$$

$$ay4\|by4<-L4(ax4,bx4);$$

$$azj<-ayj \text{ XOR } c[i][j], 1=<j=<8,$$

wherein, x||y is a concatenation of x and y. Also, Sk is a conversion by the small nonlinear permutation unit 502, Lk indicates a conversion by the linear permutation unit 503, and c[i][j] is a constant. The small nonlinear permutation unit 502 and the linear permutation unit 503 may use one and the same conversion.

Figure 7:
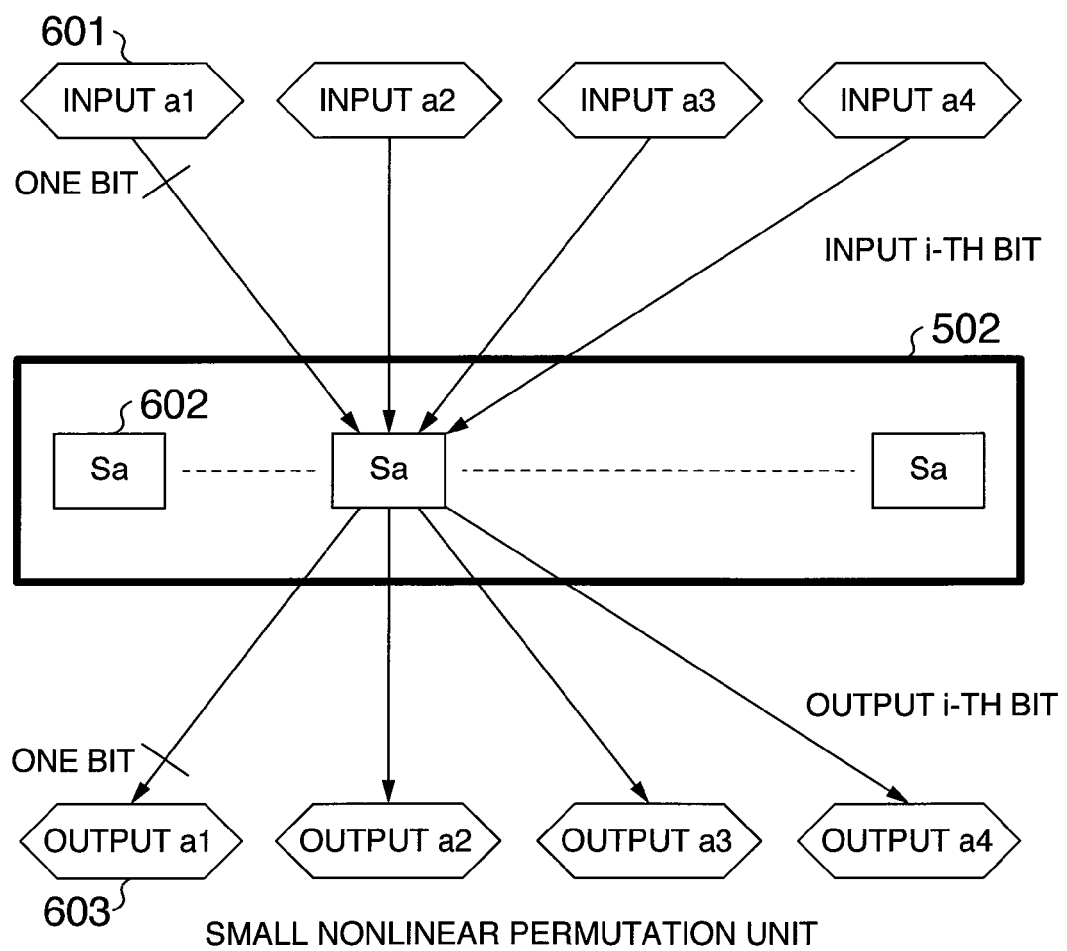
FIG. 7 is a diagram showing an example of a general configuration of the small nonlinear permutation unit employed in the nonlinear permutation unit of the embodiment.

FIG. 7 is a schematic diagram showing an example of structure of the small nonlinear permutation unit 502.

Assume that one word includes n bits. In the configuration example of FIG. 7, the small nonlinear permutation unit 502 conducts the following conversion by use of a 4-bit-input and 4-bit-output permutation table Sa 602.

$$ax4[t]\|ax3[t]\|ax2[t]\|ax1[t] \leftarrow$$

$$Sa[a4[t]\|a3[t]\|a2[t]\|a1[t]]$$

wherein, a1[t] indicates the value of a t-th bit relative to the least significant bit of a 1-word input a1. It is also possible to employ a different permutation table for each bit position.

Figure 8:
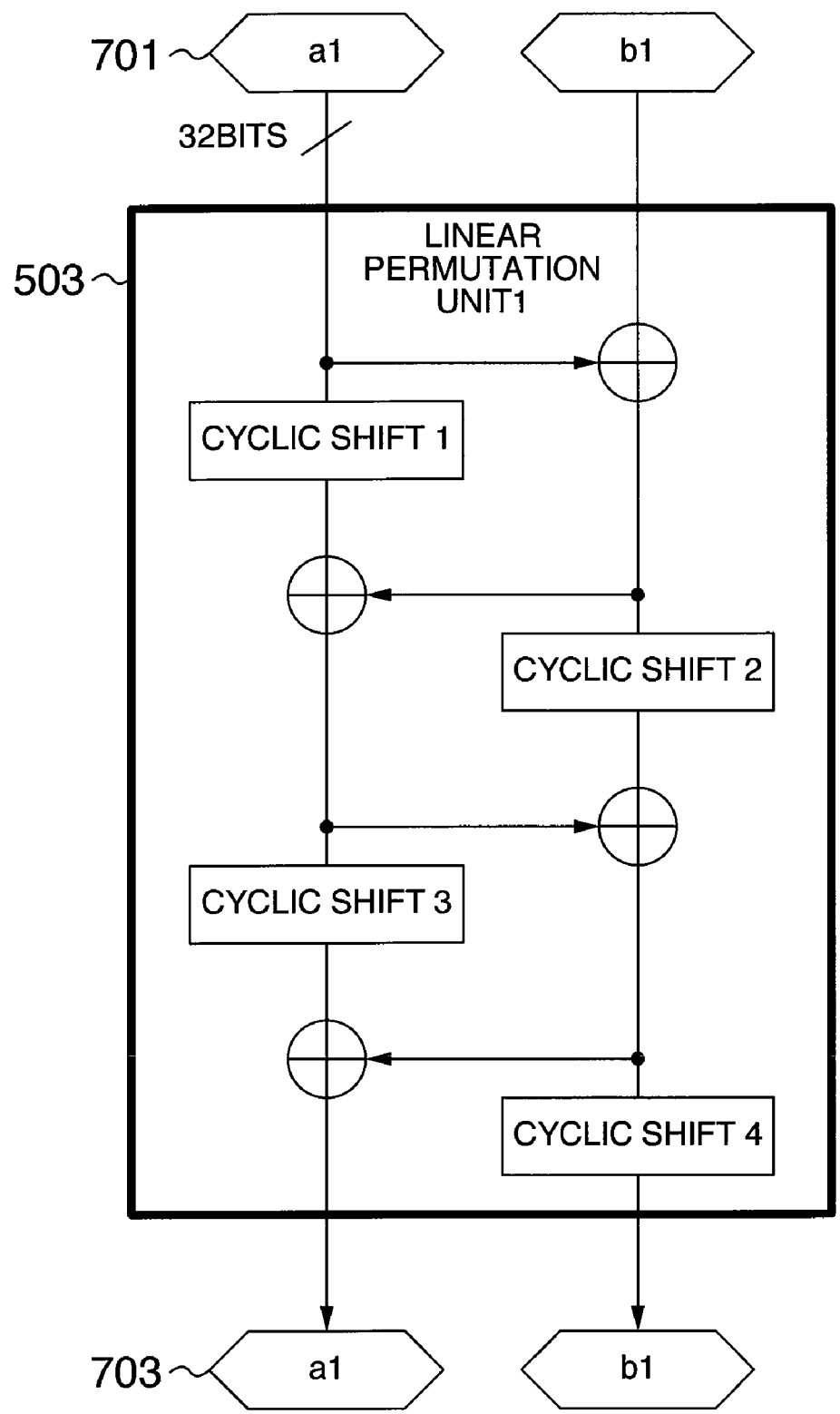
FIG. 8 is a diagram showing an example of a general configuration of the linear permutation unit employed for the nonlinear permutation in the embodiment.

FIG. 8 is a schematic diagram showing an example of structure of the linear permutation unit 503.

The linear permutation of FIG. 8 includes an exclusive OR operation and a cyclic shift operation. When the number of cyclic shift operations is sequentially represented as i1, i2, i3, and i4 from the top of FIG. 8, the linear permutation unit of FIG. 8 conducts the following conversion.

$$a \leftarrow ax1, b \leftarrow bx1;$$

$$b \leftarrow b \text{ XOR } a;$$

$$a \leftarrow a <<< i1;$$

$$a \leftarrow a \text{ XOR } b;$$

$$b \leftarrow b <<< i2;$$

$$b \leftarrow b \text{ XOR } a;$$

$$a \leftarrow a <<< i3;$$

$$a \leftarrow a \text{ XOR } b;$$

$$b \leftarrow b <<< i4;$$

$$ay1 \leftarrow a, by1 \leftarrow b;$$

wherein x XOR y indicates an exclusive OR between x an y for each bit and x<<<i indicates an operation to cyclically shift x by i bits to the left in a one-word register and ax1 and bx1 are values stored in the registers, ay1 and by1 are outputs from the linear permutation units, i1, i2, i3 and i4 are non-zero constants. The parameters i1 to i4 determining the number of cyclic shift operations may be combines with each other as, for example, (4,2,10,1). These parameters may be different values for each linear permutation unit.

The configuration examples shown in FIGS. 6 to 8 are applicable to both of the data compression units 114 shown in FIGS. 3 and 4.

Figure 9:
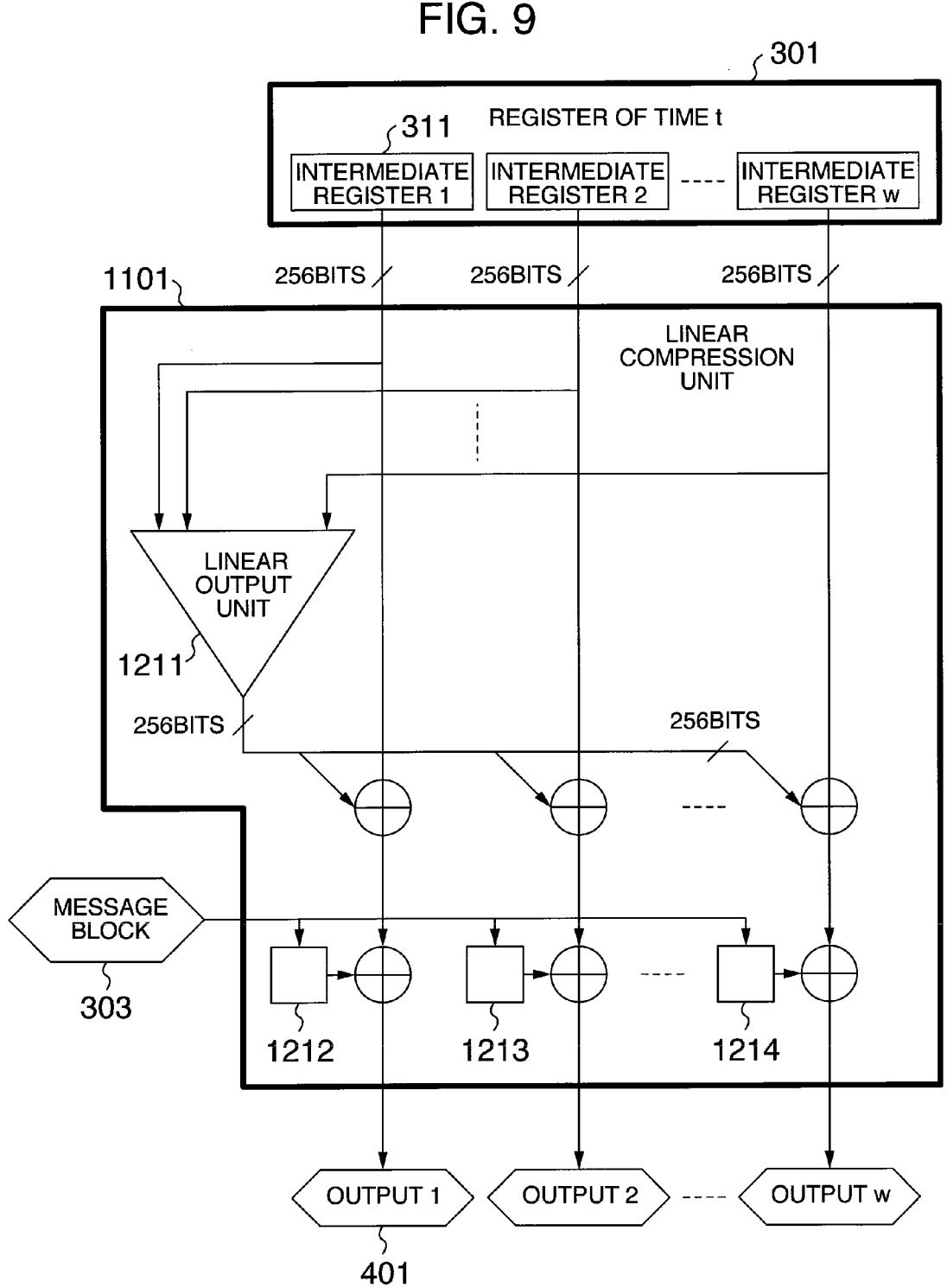
FIG. 9 is a diagram showing an example of a general configuration of the linear compression unit of the hash value generator in the embodiment.

FIG. 9 is a schematic diagram showing a configuration example of the linear compression unit 1101 of FIG. 3 in which the configuration example differs from the configurations of the linear compression units 331 shown in FIGS. 4 and 5. The linear compression unit 1101 includes a linear output unit 1211 and w linear conversion units 1212 to 1214.

It is solely required that the linear conversion units conduct mutually different permutations, for example, respectively conduct operations of "multiply by one", "multiply by two", and "multiply by four" by use of a multiplication in a finite field with elements of N-th power of two.

The linear compression unit 1101 inputs data stored in the intermediate register 311 to the linear output unit 1211, which then outputs data having a length equal to the size of the intermediate register 311. The linear output unit 1211 conducts, for example, the following conversion.

$$T \leftarrow 2*(X[1] \text{ XOR } X[2] \text{ XOR } \ldots \text{ XOR } X[w])$$

wherein T indicates an output from the linear output unit 1211 and A*B indicates multiplication between A and B in a finite field having elements of N-th power of two. An exclusive OR is calculated between the output T from the linear output unit 1211 and the value stored in the intermediate register 311. The linear compression unit 1101 calculates an exclusive OR by use of the values obtained by converting the message block 303 by the linear conversion units 1212 to 1214, the data stored in the intermediate registers 311, and the output from the linear output unit 1211.

Figure 10:
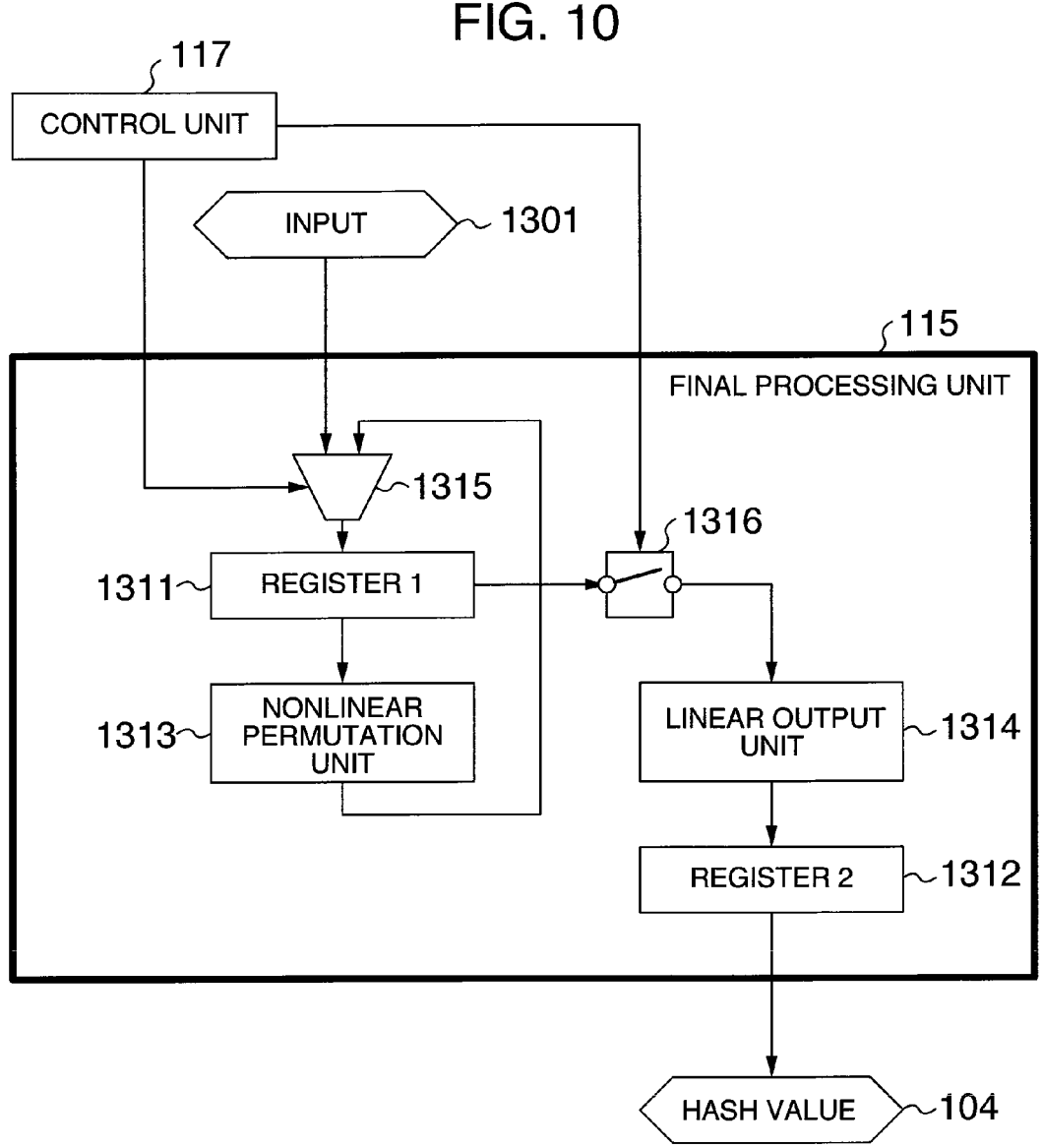
FIG. 10 is a diagram showing an example of a general configuration of the final processing unit of the hash value generator in the embodiment.

FIG. 10 is a schematic diagram showing a configuration example of the final processing unit 115 in the embodiment. When an input 1301 is received, the final processing unit 115 executes predetermined processing to output a fixed-length hash value 104. The input 1031 is inputted via the switch 119 from the register 113, and the data size thereof is equal to the size of the register 113.

The final processing unit 115 includes two registers 1311 and 1312, a nonlinear permutation unit 1313, a linear output unit 1314, a selector 1315 to control an input to the register 1, and a switch to control an input to the linear output unit 1314.

The register 2 1312 is a register to store therein the output hash value. Additionally, operations of the selector 1315 and the switch 1316 are controlled by the control unit 117. The nonlinear permutation unit 1313 may conduct a conversion equal to that of the nonlinear permutation unit 1102 of FIG. 3. Moreover, the linear output unit 1314 which is equal in the width to the input 1301 executes processing as follows if the input 1301 is, for example, w times the width of the intermediate register 311. The input 1301 is divided by the width of the intermediate register 311 to obtain w divided data pieces, and an exclusive OR is calculated by use of w divided data pieces to thereby generate an output by compressing the data pieces into data having a width of one intermediate register 311. More specifically, the unit 1314 may employ a conversion equal to that of the linear output unit 1211 of FIG. 9.

Step 1: The final processing unit 115 sets to the register 1311 data inputted via the selector 1315.

Step 2: The unit 115 receives a clock signal via the control unit 117 to repeatedly execute step 3 until the data stored in the register 2 1312 reaches a hash length. If the data reaches the hash length, the unit 115 executes processing of step 4.

Step 3: The final processing unit 115 inputs data stored in the register 1311 in the nonlinear permutation unit 1313, to store an output from the unit 1313 in the register 1 1311.

Step 4: The unit 115 inputs the data of the register 1 1311 in the linear output unit 1314, to store an output from the unit 1314 in the register 2 1312.

Step 5: The final processing unit 115 sets the switch 1316 to the connected state to output the data of the register 2 1312 as a hash value 104.

The processing of step 3 may be carried out a plurality of times before the processing of step 4.

Also, the output width of the linear output unit 1314 is desirably equal to or less than the width of the intermediate register 1 311. In a case wherein the register 1 1311 and the output unit 1314 have an equal width of 256 bits, if the output hash length is 256 bits, it is solely required to execute steps 3 to 5 only once. If the register 1 1311 has a width of 256 bits and the hash length is 512 bits, steps 3 and 4 are twice executed such that each data stored in the register 1 1311 is inputted to the linear output unit 1314. Outputs obtained as a result of two output operations of the linear output unit 1314 are combined with each other to obtain a final output. If the hash length is other than an integral multiple of the width of the intermediate register 1 311, it is solely necessary that the system generates a minimum output exceeding the hash length and then shortens the result according to necessity to obtain a final output. For example, if the hash length is 384 bits, it is only required that the system executes steps 3 to 5 twice to store an output of 512 bits in the register 2 1312 and then outputs 384 bits of the output as a hash value 104.

Incidentally, the processing of steps 3 to 5 may be changed according to the message length. For example, if the hash length is 256 bits and the message length is less than 256 bits, the input to the register 1 1311 before execution of step 3 may be outputted directly to the linear output unit 1314. Moreover, if the hash length is 512 bits and the message length is less than 256 bits, the input to the register 1 1311 before execution of step 3 and a result obtained by executing steps 3 and 4 once may be inputted to the linear output unit 1314 as an input equivalent to an input as a result of two input operations.

Figure 11:
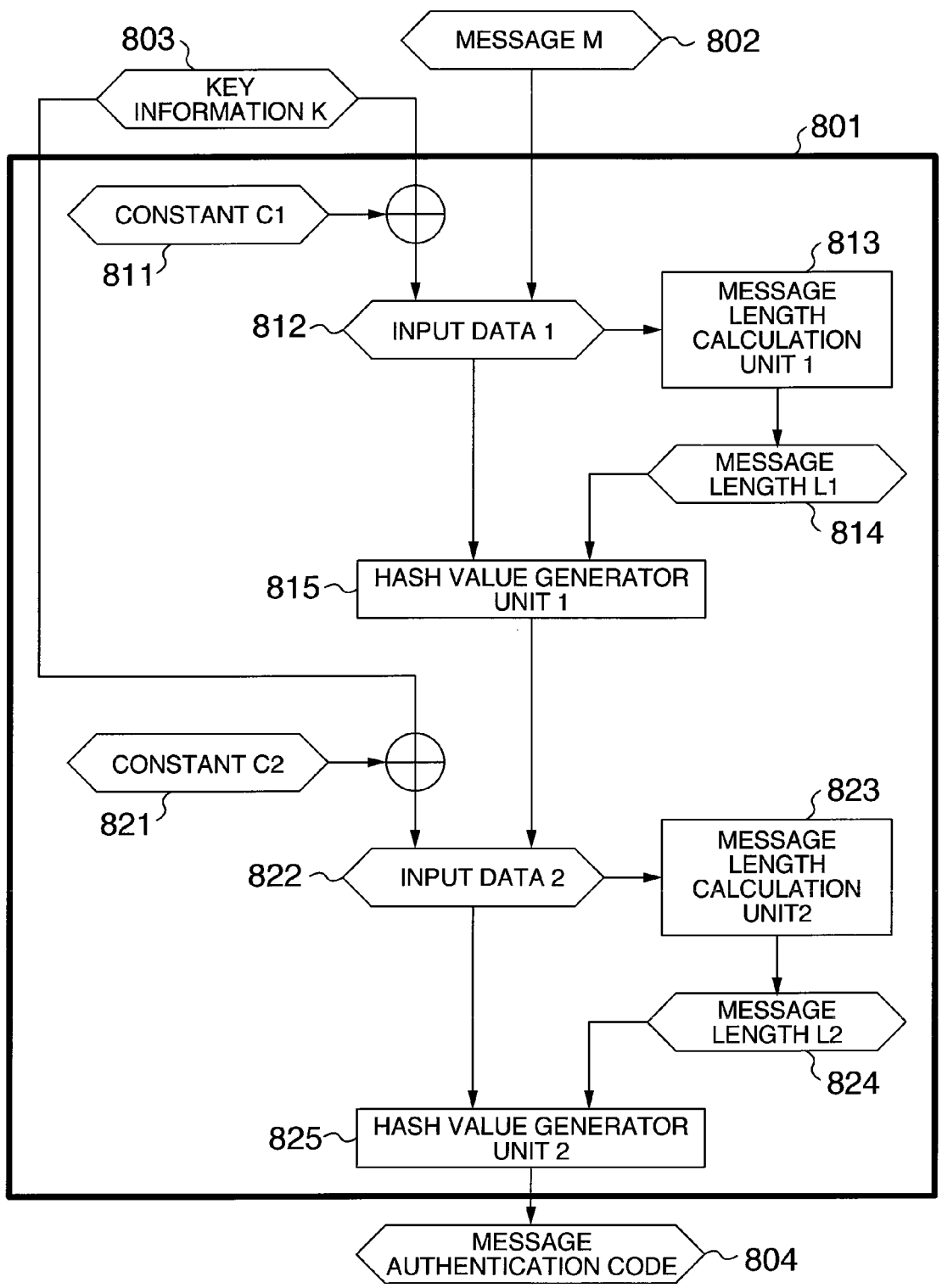
FIG. 11 is a diagram showing an example of a general configuration of the message authentication unit employing the hash value generator of the embodiment.

FIG. 11 is a schematic diagram showing a configuration example of a message authentication code generator unit employing the hash value generator unit according to the present embodiment.

The message authentication code generator unit 801 of the configuration example shown in FIG. 11 includes two message length calculation units and two hash value generator units. When a message 802 having an arbitrary length and key information 803 are received as inputs thereto, the code generator unit 801 outputs a message authentication code 804, which is a fixed-length random number, according to a procedure as below.

Step 1: The generator unit 801 calculates an exclusive OR using the key information 803 and a constant C1 and then combines the exclusive OR result with a message M 802 to create input data 1 812.

On receiving the input data 1 812, the message length calculation unit 1 813 outputs its data size as a message length L1 814.

Step 3: When the input data 1 812 and the message length L1 814 are received, the hash value generator unit 1 815 outputs a hash value of the input data 1 812.

Step 4: The message authentication code generator unit 801 calculates an exclusive OR by use of the key information 803 and a constant C2 and then combines the exclusive OR result with the hash value created in step 3 to generate input data 2 822.

Step 5: When the input data 2 822 is received, the message length calculation unit 2 823 outputs its data size as a message length L2 824.

Step 6: When the input data 2 822 and the message length L2 824 are received, the hash value generator unit 2 825 outputs a hash value of the input data 2 822 as a message authentication code 804.

A favorable application example of the embodiment is a user authentication system for a terminal such as a cellular to access a server. Next, description will be given of an authentication system using the present embodiment.

Figure 12:
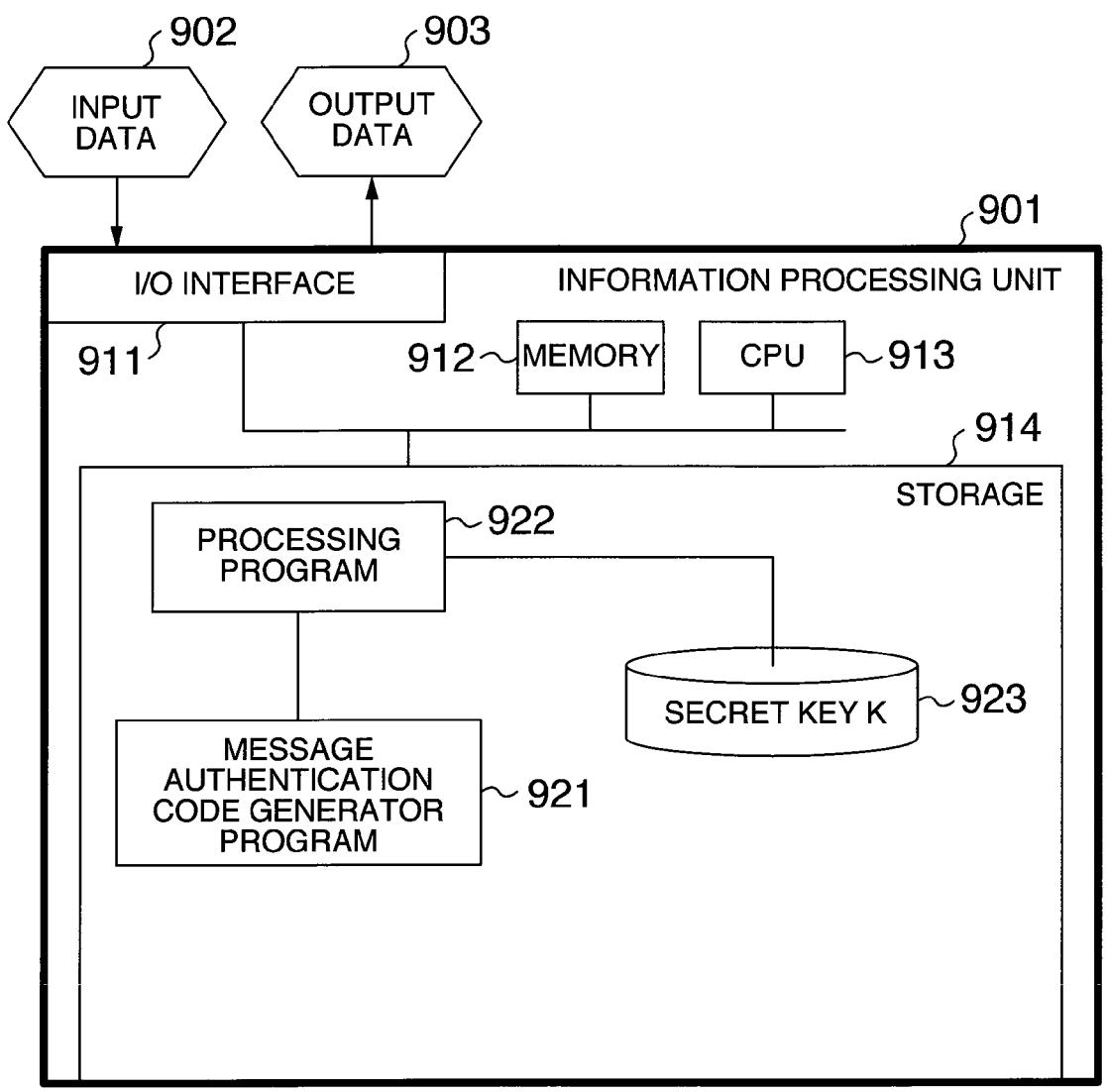
FIG. 12 is a diagram showing an example of a general configuration of the authentication unit according to the embodiment.

FIG. 12 is a schematic diagram showing structure of an authentication unit to execute authentication processing by use of the hash value generator 101 of the embodiment.

The authentication unit 901 includes an Input/Output (I/O) interface 911, a memory 912, a CPU 913, and a storage 914. The storage 914 stores a message authentication code generation program 921 which implements the message authentication code generation unit by use of software, a processing program 922 in which the code generation program 921 is incorporated, and key information 923. When input data 902 is received via the I/O interface 911, the authentication unit 901 executes processing according to a procedure as below to produce a message authentication code 904 as output data 903.

Step 1: The authentication unit 901 loads in the memory 912 the authentication program in which the code generation program 921 is incorporated.

Step 2: The unit 901 loads the key information 923 of the storage 914 in the memory and inputs the information together with the input data 902 via the I/O interface 911 to the processing program 922.

Step 3: The program 922 inputs the input data 902 and the key information 923 to the message authentication code generation unit 921 to calculate a message authentication code 804.

Step 4: The program 922 outputs the message authentication code 804 calculated in step 3, as output data 903 via the I/O interface 911 therefrom.

Figure 13:
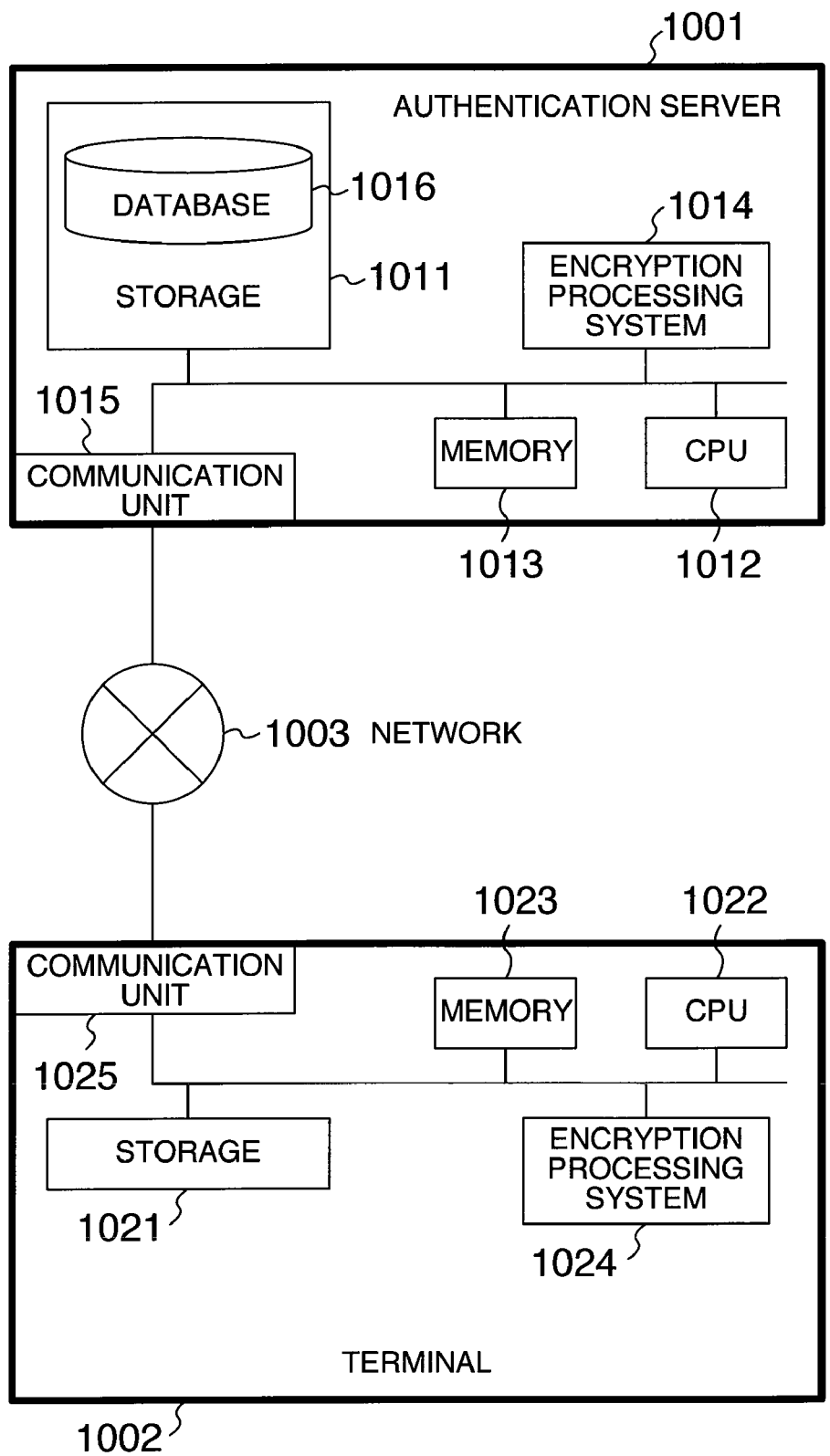
FIG. 13 is a diagram showing an example of a general configuration of the authentication unit employing the hash value generator of the embodiment.

FIG. 13 is a configuration example of an apparatus authentication system as an application of the present embodiment.

The apparatus authentication system 1001 includes an authentication server 1001, a terminal 1002, and a network 1003 as a communication path. The network may be a wired or wireless network. Also, the terminal may be, for example, a Personal Computer (PC), a cellular phone, a sensor, or an IC card.

The authentication server 1001 includes a storage 1011, a CPU 1012, a memory 1013, an encryption processing system 1014, and a communication unit 1015. The storage 1011 stores a database 1016 of terminal information including an identifier (ID) of a terminal and key information. The terminal 1002 includes a storage 1021, a CPU 1022, a memory 1023, an encryption processing system 1024, and a communication unit 1025.

The authentication processing of the terminal 1002 is executed in the following procedure.

Step 1: The terminal 1002 transmits an authentication request signal and a terminal ID via the network 1003 to the authentication serve 1001.

Step 2: When the authentication request signal is received, the server 1001 generates a random number by using the encryption processing system 1014 and sends the random number via the network 1003 to the terminal 1002.

Step 3: When information of the random number is received, the terminal 1002 inputs the information together with key information 923 to the encryption processing system 1024 to calculate a message authentication code and returns the code to the server 1001.

Step 4: The server 1001 accesses the database 1016 to extract associated key information 923 from the ID information of the terminal and inputs the information together with the random number information generated in step 2 to the encryption processing system 1014 to calculate a message authentication code.

Step 5: When the message authentication code transmitted from the terminal 1002 in step 3 is received, the serve 1001 confirms whether or not the message authentication code matches that calculated in step 4.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. A hash value generator for compressing a message having an arbitrary length and thereby generating a digest of the message, comprising:

a message padding unit for receiving as an input thereto a message M having an arbitrary length, executing padding processing for the message M, the message M being divided into message blocks each having a fixed length, and sequentially outputting a fixed-length message block M[i] according to a clock i, a register for storing therein an intermediate value of conversion processing, an initializer unit for setting an initial value to the register, a compression unit for conducting a conversion according to the clock i by use of the value stored in the register and the message block M[i] output from the message padding unit and thereby producing as an output therefrom a conversion result having a length of the register, a register control unit for updating, according to the clock i, the value of the register by use of the output from the data compression unit, and a final processing unit for producing as an output therefrom a fixed-length bit string by use of the value stored in the register, wherein:

the compression unit comprises:

a linear compression unit for producing as an output therefrom a conversion result having a length of the register by use of the message block M[i] and the value stored in the register; and a nonlinear permutation unit for outputting a conversion result having a length of the register by use of the output from the linear compression unit, the linear compression unit executes the following processing:

$$T \leftarrow C*(X[1] \text{ XOR } X[2] \text{ XOR } \ldots \text{ XOR } X[w]),$$

$$Y[j] \leftarrow L[j](M[i]) \text{ XOR } T \text{ XOR } X[j],$$

$$Y \leftarrow Y[1]\|Y[2]\|\ldots\|Y[w]; \text{ and}$$

the value stored in the register is divided into message block length units, the values of which are X[1], X[2], ..., X[w], where:

A←B indicates that B substitutes for A;

A||B indicates a concatenation of A and B,

A XOR B indicates an exclusive OR between A and B for each bit,

A*B is multiplication between A and B in a finite field,

C is a non-zero constant,

L[j]( ) indicates an output from the mutually different linear permutation unit, M[i] indicates an i-th message block outputted from the message padding unit, X is a value stored in the register, and Y is an output from the linear compression unit.

2. A hash value generator according to claim 1, wherein:

the nonlinear permutation unit further comprises a second nonlinear permutation unit an input to which has a further shorter length; and the compression unit executes the following processing:

$$Y[1]\|Y[2]\|\ldots\|Y[w] \leftarrow Y,$$

$$Z[j] \leftarrow Qj(Y[j]), (1 \leq j \leq w),$$

$$Z \leftarrow Z[1]\|Z[2]\|\ldots\|Z[w]$$

Qj( ) indicates an output from the second non linear permutation unit, and

Z indicates an output from the non linear permutation unit.

3. A hash value generator according to claim 2, wherein the second nonlinear permutation unit comprises a third nonlinear permutation unit an input of which comprises eight words and which comprises a permutation table in units of four to eight bits, a linear permutation unit an input of which comprises two-word data, a constant adding unit, and a control unit to execute loop processing, wherein the constant to be added by the constant adding unit differs for each loop.

4. A hash value generator according to claim 3, wherein the linear permutation unit executes processing as below:

$$a \leftarrow ax1, b \leftarrow bx1;$$

$$b \leftarrow b \text{ XOR } a;$$

$$a \leftarrow a <<< i1;$$

$$a \leftarrow a \text{ XOR } b;$$

$$b \leftarrow b <<< i2;$$

$$b \leftarrow b \text{ XOR } a;$$

$$a \leftarrow a <<< i3;$$

$$a \leftarrow a \text{ XOR } b;$$

$$b \leftarrow b <<< i4;$$

$$ay1 \leftarrow a, by1 \leftarrow b;$$

wherein, x XOR y indicates an exclusive OR between x and y for each bit and x<<<i indicates an operation to cyclically shift x by i bits to the left in a one-word register and ax1 and bx1 are values stored in the registers, ay1 and by1 are outputs from the linear permutation units, i1, i2, i3 and i4 are non-zero constants.

5. A hash value generator according to claim 4, characterized in that of the parameters i1, i2, i3, and i4 determining the linear permutation, i1 to i3 are even numbers, i4 is an odd number, and i2 is indivisible by four.

6. A hash value generator according to claim 2, wherein the final processing unit comprises a second register, a third register, a linear output unit for linearly combining values stored in the second register with each other to produce an output value and outputting the output value to the third register, and a nonlinear permutation unit for converting the value stored in the second register, wherein the hash value generator repeatedly executes processing of the nonlinear permutation unit and the linear output unit until data stored in the third register reaches a predetermined output bit length.

7. A message authentication code generator for producing as an output therefrom a fixed-length bit string using a fixed-length secret key and a message having an arbitrary length, characterized by comprising a hash value generator according to claim 1.

8. A system comprising:

at least one server, a plurality of terminals, and a network, wherein the server comprises an arithmetic unit, a memory, a storage, a communication unit, and an encryption processing unit;

the terminal comprises an arithmetic unit, a memory, a storage, and an encryption processing unit; and the encryption processing units comprise a hash value generator according to claim 1.

* * * * *